US009023151B2

(12) United States Patent
Pellerin et al.

(10) Patent No.: US 9,023,151 B2
(45) Date of Patent: May 5, 2015

(54) SET-ACCELERATING ADMIXTURE HAVING IMPROVED STABILITY

(71) Applicant: Chryso, Issy les Moulineaux (FR)

(72) Inventors: Bruno Pellerin, Avon (FR); David Babayan, Fresnes (FR); Frédéric Rudolph, Ramoulou (FR)

(73) Assignee: Chryso, Issy les Moulineaux (FR)

( * ) Notice: Subject to any disclaimer, the term of this patent is extended or adjusted under 35 U.S.C. 154(b) by 0 days.

(21) Appl. No.: 14/376,830

(22) PCT Filed: Feb. 6, 2013

(86) PCT No.: PCT/EP2013/052321
§ 371 (c)(1),
(2) Date: Aug. 5, 2014

(87) PCT Pub. No.: WO2013/117586
PCT Pub. Date: Aug. 15, 2013

(65) Prior Publication Data
US 2015/0027347 A1 Jan. 29, 2015

(30) Foreign Application Priority Data

Feb. 6, 2012 (FR) ...................................... 12 51096

(51) Int. Cl.
C04B 24/12 (2006.01)
C04B 28/14 (2006.01)
C04B 22/14 (2006.01)
C04B 22/06 (2006.01)

(52) U.S. Cl.
CPC ............... C04B 24/121 (2013.01); C04B 28/14 (2013.01); C04B 22/141 (2013.01); C04B 22/062 (2013.01)

(58) Field of Classification Search
USPC ........................................ 106/727, 736, 819
See application file for complete search history.

(56) References Cited

FOREIGN PATENT DOCUMENTS

EP 0 805 128 A2 11/1997
WO WO 03/106375 A1 12/2003
WO WO 2009/060405 A1 5/2009

Primary Examiner — Paul Marcantoni
(74) Attorney, Agent, or Firm — Knobbe, Martens, Olson & Bear, LLP

(57) ABSTRACT

The present invention is mainly aimed at a set-accelerating admixture for hydraulic compositions comprising, in an aqueous solution,
the reaction product of an alkanolamine with a concentrated strong acid;
sulfate anions; and
alkali or alkaline earth cations;
having a pH comprised between 5 and 12. Moreover it is directed to a method for its preparation as well as to a method for preparing hydraulic compositions comprising the step for adding such an admixture to the hydraulic binder, before, during or after the grinding.

15 Claims, 2 Drawing Sheets

SET-ACCELERATING ADMIXTURE HAVING IMPROVED STABILITY

FIELD OF THE INVENTION

The present invention relates to a set-accelerating admixture, to a method for its preparation and to its use notably for accelerating the setting of a hydraulic composition and for attaining high early strengths.

BACKGROUND OF THE INVENTION

It is customary to add admixtures to hydraulic compositions, in order to modulate the properties thereof during application and after hardening.

It is thus known how to modify the hydraulic setting characteristics by adding set-accelerating agents and set-retardants.

Accelerating the setting is particularly of interest economically since it allows an increase in the manufacturing rate and also allows working under winter conditions.

Certain salts, notably alkaline salts like sodium chloride or earth alkaline salts like calcium chloride are widely used as accelerators for setting and hardening Portland cement.

The capability of these salts of improving mechanical strengths in compression may however be limited in the case of cements with low clinker content, because these salts accelerate more particularly the hydration of the phases of the clinker.

In order to limit corrosion caused by an excessive content of chlorides, patent U.S. Pat. No. 4,318,744 proposes admixtures including an alkanolamine.

However, the formulation of an admixture comprising several compounds associated with the various admixtures may pose problems. Thus, formulations of admixtures that associate sulfates and alkaline salts are not stable at low temperature, since they tend to crystallize when stored under cold conditions, because of low solubility of sodium sulfate. In order to avoid precipitation of the alkaline sulfate of the solution, it is then necessary to store these admixtures in a heated environment.

SUMMARY OF THE INVENTION

Therefore the object of the present invention is to propose an admixture for hydraulic compositions which avoids the mentioned drawbacks, and notably which reduces the setting time, gives the possibility of ensuring good compressional strength at an early stage, limits corrosion phenomena and which is stable at low temperature.

According to the invention, this object is achieved according to the invention by a set-accelerating admixture for hydraulic compositions comprising in an aqueous solution:
  the reaction product of an alkanolamine with a concentrated strong acid;
  sulfate anions; and
  alkaline or earth alkaline cations;
having a pH comprised between 5 and 12.

DETAILED DESCRIPTION OF THE PREFERRED EMBODIMENT

The term of "strong acid" is meant to designate an acid for which the acidity constant $K_a$ in an aqueous solution is such that $pK_a<1.7$. In these acids, all the acid molecules are dissociated.

By the term of "concentrated acid" is meant an acid having a water content of less than 30% and preferably less than 10% by weight.

The term of "aminium salt" designates a salt of a protonated amine.

By "low temperature" in this context is notably meant a temperature of less than 20° C., preferably less than 5° C. and notably less than 0° C.

By the term of "hydraulic composition" is meant a composition comprising water and a hydraulic binder.

By the term of "hydraulic binder" is meant any compound having the property of being hydrated in the presence of water and the hydration of which allows a solid to be obtained having mechanical characteristics notably a cement like Portland cement, aluminous cement, pozzolanic cement or further anhydrous calcium sulfate or semihydrate. Hydraulic binders based on Portland cement described in the NF EN 197-2 standard may further include pozzolanic materials such as slags from blast furnaces, flying ashes, natural pozzolans, silica fumes. The hydraulic binder may in particular be a cement according to the EN 197-1 standard and notably a Portland cement, and in particular a cement of the CEM I, CEM II, CEM III, CEM IV or CEM V type according to the NF EN 197-1 cement standard.

By the term of "concrete", is meant a mixture of hydraulic binders, of granulates, water, optionally additives, and optionally mineral additions. The term of concrete also comprises mortars.

Hydraulic binders based on Portland cement may further include mineral additions. The expression of "mineral additions" designates slags (as defined in the NF EN 197-1 cement standard in paragraph 5.2.2), steel-making slags, pozzolanic materials (as defined in the NF EN 197-1 cement standard in paragraph 5.2.3), flying ashes (as defined in the NF EN 197-1 cement standard in paragraph 5.2.4), calcined shales and clays (as defined in the NF EN 197-1 cement standard in paragraph 5.2.5), limestones (as defined in the NF EN 197-1 cement standard in paragraph 5.2.6) or further silica fumes (as defined in the NF EN 197-1 cement standard in paragraph 5.2.7) or mixtures thereof.

Indeed, it is seen that this formulation is stable under cold conditions, so that the admixture may be stored at low temperature in a prolonged way without observing any precipitation.

Moreover, the admixture allows the preparation of hydraulic compositions having a shortened setting time but nevertheless having good compressional strength at an early stage, notably at 1, 2, 7 and 28 days.

The admixture according to the invention first of all contains the product of an alkanolamine with a concentrated strong acid. The alkanolamine has an accelerating, in particular hardening effect. In the case when the admixture is added to the hydraulic binder prior to grinding, it may also act as a grinding agent, in order to facilitate grinding.

Preferably, the alkanolamine is an amine having a molar mass comprised between 50 and 400 g/mol. it may notably be selected from triethanolamine (TEA), triisopropanolamine (TIPA), diethanolamine (DEA), diethanolisopropanolamine (DEIPA) and tetrahydroxylethylethylenediamine (THEED) and mixtures thereof. Preferably the alkanolamine is triethanolamine.

As this will be explained in more detail later on, the admixture according to the invention contains the alkanolamine as a reaction product with a concentrated strong acid.

It may be assumed that the alkanolamine forms a salt with a strong acid similar to the reaction of other amines. Although the exact composition of the obtained product has not yet been specifically elucidated, it is assumed that the alkanolamine forms by reaction with a strong acid, an adduct, for example as an aminium salt (also called ammonium salt). However the occurrence of a different reaction notably at the alkanol groups is not excluded.

The compound form may be present in the aqueous solution in a dissociated form or not, depending on the pH of the solution.

The admixture preferably includes 0.05 to 0.6 mol/L of reaction product of the alkanolamine.

The sulfates present in the admixture according to the invention have the function of ensuring acceleration of the setting of the hydraulic composition while limiting the presence of chloride ions, the excessive presence of which may generate corrosion phenomena. Moreover they are particularly efficient as set-accelerating agents for cements with low clinker content.

The admixture according to the invention preferably comprises a content of sulfate anions comprised, in the limit of their solubility, between 0.1 and 1.5 mol/L.

These anions may be introduced into the admixture notably by means of alkali or alkaline earth metal sulfates, notably sodium, potassium or calcium sulfates.

Alternatively, it is also possible to introduce the sulfates via the addition of sulfuric acid, as this will be explained later on.

Quite unexpectedly, it was discovered that the adjustment of the pH of the admixture to a suitable value gives the possibility of ensuring the stability of the formulation.

Within this framework, it was observed that a pH comprised between 5 and 12 allows storage at a temperature of 5° C. for 15 days without the appearance of precipitations visible to the naked eye.

The admixture according to the invention therefore preferably has a pH comprised between 5 and 9, and at most preferentially between 5.5 and 7.

The admixture according to the invention may moreover contain an additional set-accelerating agent. By the term of <<set-accelerating agent>> is meant a compound, the presence of which in the hydraulic composition increases the hydraulic setting rate of the composition. Their performances are notably indicated in the US standard ASTM C494. This is most often a salt, which may notably be an inorganic compound, and it may notably be selected from sodium chloride, calcium chloride, sodium thiocyanate, calcium thiocyanate, sodium nitrate and calcium nitrate and mixtures thereof.

The admixture according to the invention preferably comprises a chloride anion content comprised between 1.5 mol/L and 5 mol/L.

However, it is preferable to limit the chloride content in the binder to a value not exceeding 0.1% by weight of binder so that the concrete may be used in the making of reinforced concrete in order to reduce the risk of corrosion. This value may even be lower for applications of the pre-stressed concrete type. The supply of chlorides by the means of admixture should therefore be limited as much as possible.

Thus, it is recommended in certain standards, notably the EN 196 and 197 standards for cement, and the EN-934 for concrete, to limit the chloride content of cement to 1,000 ppm by weight of chlorides. The admixture according to the invention preferably provides less than 500 ppm, and most particularly less than 300 ppm of chlorides to the cement.

According to a second aspect, the invention aims at a method for preparing an accelerating admixture for hydraulic compositions comprising the steps:
(1) adding a concentrated strong acid to an aqueous solution of alkanolamine;
(2) adding to the product obtained in step (1) an aqueous solution of an alkali or alkaline earth metal chloride and/or sulfate; and
(3) adjusting the pH to a value from 5 to 12, before or after step (2).

The collected experimental elements seem to indicate that a transformation occurs in step (1). Indeed, the mixture of a solution of sulfate salts with the alkanolamine does not have the same infrared spectrum as the mixture of the alkanolamine with one of a concentrated sulfuric acid. This teaching may be generalized to the mixtures of alkanolamines with other strong acids or anions.

Preferably the acid is a strong acid, and most particularly a concentrated acid.

Among the suitable strong acids, are of particular interest the acids which do not introduce new ions into the hydraulic composition. Therefore inorganic strong acids will therefore be preferred and among the latter sulfuric acid, hydrochloric acid and nitric acid.

Preferably, the anion of the selected acid is different from the anions introduced into the aqueous solution in step (2).

Thus, according to an embodiment of the invention, step (1) is carried out by adding concentrated sulfuric acid and step (2) is carried out by adding a solution of an alkaline metal chloride.

According to another embodiment, step (1) is carried out by adding concentrated hydrochloric acid and step (2) is carried out by adding a solution of an alkaline metal sulfate.

An additional set-accelerating agent may if necessary also be added in step (2).

The molar ratio between the amine and the acid in step (1) is advantageously comprised between 0.2 to 0.6.

Step (3) is advantageously carried out by adding a base, notably a strong base and most particularly a base selected from sodium hydroxide and potassium hydroxide.

The composition of the admixture has not yet been determined accurately. However, as mentioned, it was shown that the addition of a concentrated strong acid to the alkanolamine solution modifies the composition of the product.

Also, according to a third aspect, the invention aims at a set-accelerating admixture for hydraulic compositions obtainable by the thereby described method.

According to a fourth aspect, the invention aims at a method for preparing a hydraulic composition, comprising the step of adding an admixture according to the invention to the hydraulic binder, before, during or after grinding. The admixture may thus be used in cement plant grinders or be directly incorporated in plants which proceed with the mixing of Portland cement and of pre-ground additions.

The admixture may however also be used at the moment of the preparation of the hydraulic composition, for example by being added into the mixing water.

Preferably, this method is applied in that the admixture is added with a dosage from 500 to 10,000 ppm by weight based on the weight of the hydraulic binder.

The method for preparing a hydraulic composition according to the invention is particularly useful for hydraulic binders described in the NF EN 197-2 standard including a lower clinker content and a higher content of pozzolanic materials such as slags from blast furnaces, flying ashes, natural pozzolana, silica fumes. The cements designated as CEM II, CEM III, CEM IV and CEM V, are thus preferred for this invention.

Also, the preparation method is more preferred when the hydraulic binder is a cement containing less than 75%, and preferably less than 65% by weight of clinker.

BRIEF DESCRIPTION OF THE DRAWINGS

The invention will be better understood by means of the following examples and with reference to the three figures which show.

EXAMPLE 1

Step (1). In a suitable 3 L container provided with a magnetic stirrer, 192 g of triethanolamine with 85% purity by weight provided by BASF were dissolved in 1,466 mL of water at room temperature. 342 g of concentrated sulfuric acid solution (96% by weight content) were then introduced. It is observed that the temperature of the reaction mixture rises to 35° C.

Step (2). To 240 mL of the solution obtained in the previous step, are added 53.81 mL of water and 14.5 g of NaCl. Stirring is maintained until a limpid solution is formed.

Step (3). The pH of the obtained solution was adjusted to a value of 7 by adding 7.69 g of a 50% by weight sodium hydroxide solution.

a. Study of the Compound Formed in Step (1)

The identity of the compound formed in the solution at the end of step (1), after adding the acid, has not yet been elucidated with certainty.

Figure 1:
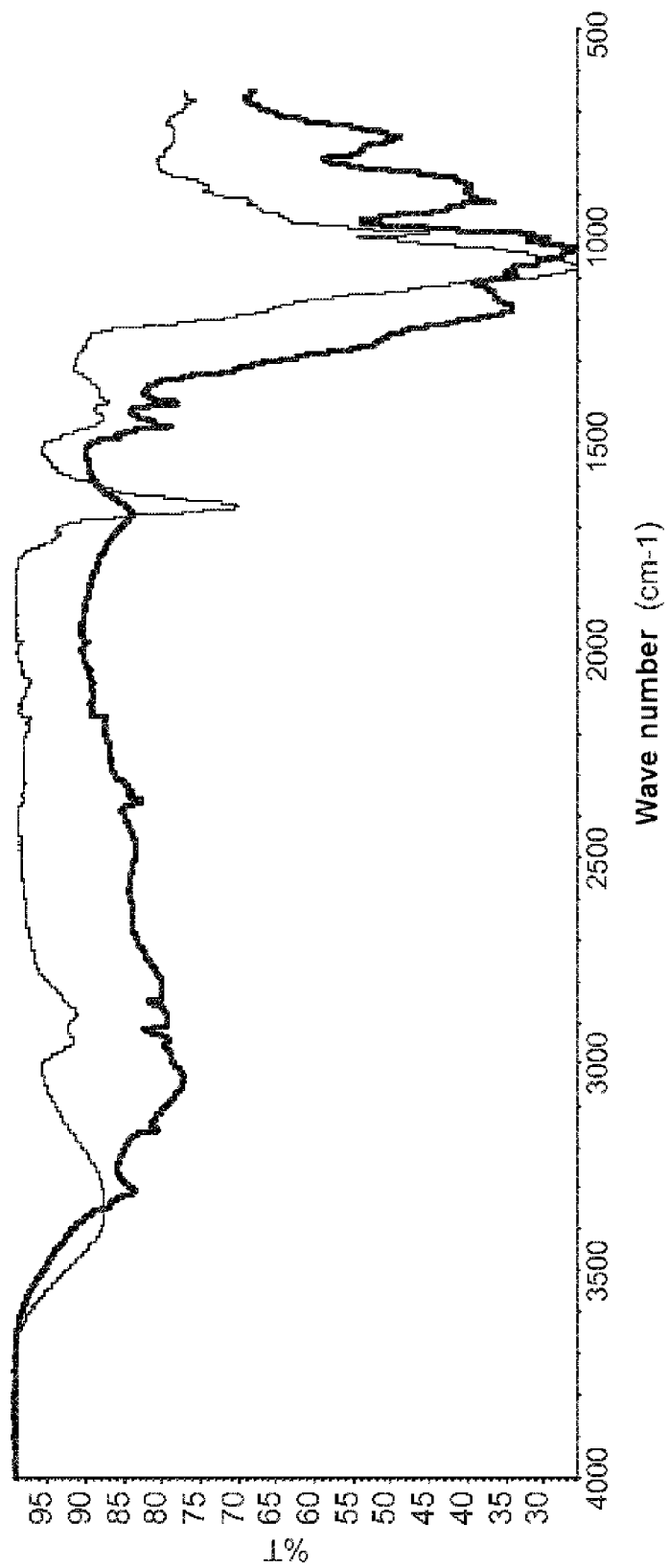
FIG. 1: the infrared spectrum of residues of the solution at the end of step (1) of Example 1 and of a solution of triethanolamine and sodium sulfate of equivalent proportions.

In order to characterize the product formed in the triethanolamine acid solution, the solution obtained after adding sulfuric acid is dried for 24 hours in the oven heated to a temperature of 105° C. The solid residue is analyzed by Fourier transform infrared spectroscopy, as compared with the residue of a solution with equivalent proportions of triethanolamine and sodium sulfate. The obtained spectrum (see FIG. 1) shows a composition difference of the compounds present in these solutions.

Without intending to be bound by any theory, it is presently assumed that the amine forms an aminium sulfate in the presence of the acid.

b. Cold Stability According to the pH

In order to study the impact of the pH on the stability of the admixture according to the invention, admixtures were made according to Example 1 having a different pH.

For this purpose, the amount of KOH solution added in step (3) of the procedure indicated in Example 1 was varied in order to obtain solutions with a pH comprised between 4 and 12.

The aspect of the prepared samples, having a pH ranging from 4.5 to 9.0, was determined immediately after preparation before placing them at a temperature of 5° C. The aspect of the solutions is then checked at regular intervals for a period of 15 days.

The results of this study are recorded in Table 1 below.

TABLE 1

Cold stability of the admixtures according to the pH

| Formulation | pH | Aspect | Stability |
|---|---|---|---|
| EX. 1 | 4.5 | Visible crystallization after 24 h | NO |
| EX. 1 | 5.1 | Visible crystallization after 5 days | YES |
| EX. 1 | 5.8 | No visible crystallization after 15 days | YES |
| EX. 1 | 7.0 | No visible crystallization after 15 days | YES |
| EX. 1 | 9.0 | No visible crystallization after 15 days | YES | c. Action Reinforcing the Compressional Strength at an Early Stale

In order to validate the performance of the admixture according to the invention in different applications, the compressional strength was measured at 1, 2, 7 and 28 days according to the EN-196-1 standard, of a mortar prepared with a cement admixed with the admixture according to the invention comprising 58% by weight of Portland cement, which consists of about 95% by weight of clinker and of 5% by weight of gypsum, and 42% by weight of slag.

The mortar specified by the aforementioned standard is prepared by mixing:
450 g of hydraulic binder,
1,250 g of standardized sand;
225 g of water containing the admixture of the invention.

In order to measure the mechanical compressional strength, prisms are made with dimensions of 4×4×16 cm. For each term, three prisms are prepared and two measurements are made per prism, which makes a total of six measurements for each term. Table 2 groups the average values for each term.

TABLE 2

Application performance of the admixture

| | Admixture | | Compressional strength [MPa] | | | |
|---|---|---|---|---|---|---|
| No. of test | Type | Dosage [ppm of binder] | 1 day | 2 days | 7 days | 28 days |
| 1 | — | — | 10.1 | 18.1 | 33.0 | 52.0 |
| 2 | EX. 1 | 3000 | 11.8 | 19.3 | 34.5 | 55.2 |
| 3 | EX. 1 | 4000 | 11.4 | 19.4 | 35.7 | 52.4 |
| 4 | EX. 1 | 5000 | 12.6 | 19.4 | 35.8 | 51.5 |

It emerges that the strengths obtained with the admixture according the invention are at least equivalent, or even better than for the control without any admixture.

It is noted as regards these results that the dosage of 3,000 ppm is more favorable for the strength at 28 days and the dosage of 5,000 ppm is favorable for the strength at 1 day.

d. Study by Isothermal Calorimetry

Isothermal calorimetry measurements were conducted in order to study the effect of the admixture according to the invention on the hydraulic setting process. With isothermal calorimetry, it is possible to measure the heat emitted over time during the first hours of the setting of a hydraulic binder.

The tests were conducted by preparing in a suitable flask, a cement slurry of the CEM III type, containing 60% by weight of blast furnace slag and 40% by weight of Portland cement, with a water-over-cement (W/C) mass ratio of 0.5, by adding to the mixing water, 3,000 ppm of admixture according to Example 1 based on the weight of the cement. As a comparison, the same cement slurry was prepared without any admixture according to the invention.

Immediately after preparation, the flask is introduced with the slurry into an isothermal calorimetry device set to a temperature of 20° C. and the emitted heat is then recorded for a period of 65 h.

Figure 2:
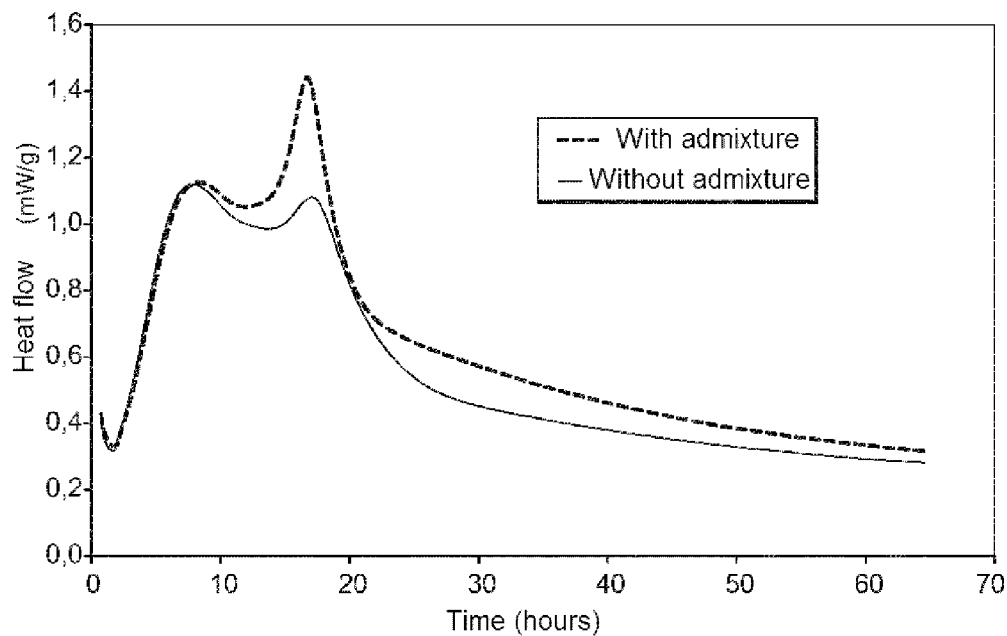
FIG. 2 the instantaneous heat flow measured by isothermal calorimetry on a TAM Air device from TA Instruments of a cement slurry with and without the admixture according to the invention.
Figure 3:
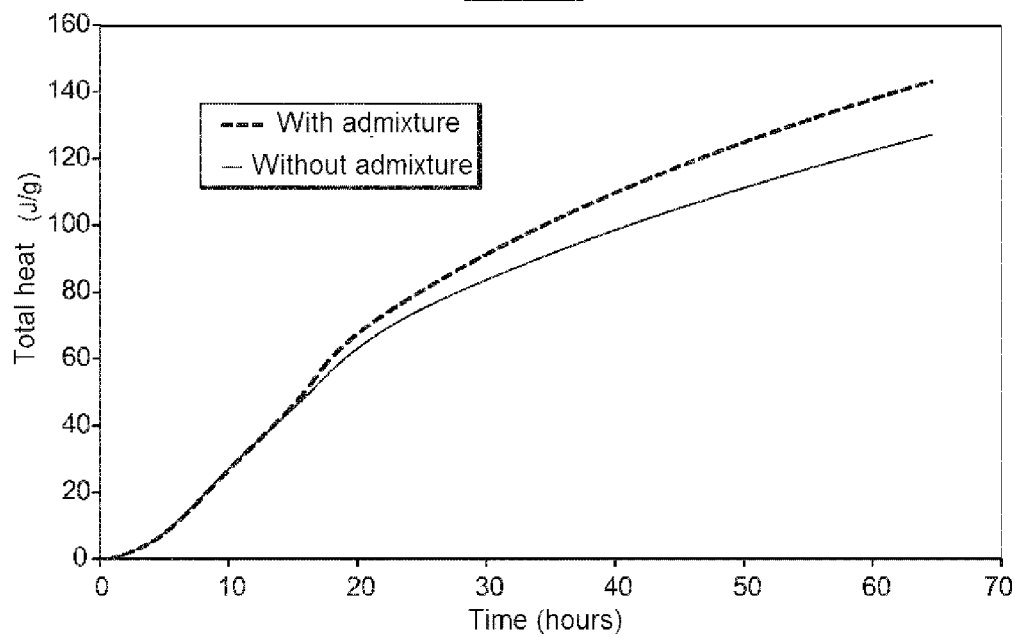
FIG. 3 and the accumulated heat measured by isothermal calorimetry on a TAM Air device from TA Instruments of cement slurry with and without the admixture according to the invention

The results of the measurement (see FIG. 2) show that the presence of the admixture according to the invention notably increases the heat flow from about 10 hours of hydration.

This second peak is only observed for cements with the slag contents. It therefore seems that the admixture according to the invention favorably interacts during hydration of the slags. The admixture according to the invention is therefore particularly of interest for set-accelerating cements with strong slag contents or other pozzolanic additions rich in silicates and aluminates.

It is also seen that the total heat versus time increases for the slurry including the admixture according to the invention.

These results show that the addition of the admixture according to the invention induces an increase in the emitted heat over time, synonymous with accelerating the setting reaction.

The invention claimed is:

1. A set-accelerating admixture for hydraulic compositions comprising, in an aqueous solution:
   the reaction product of an alkanolamine with a concentrated strong acid;
   sulfate anions; and
   alkali or alkaline earth cations;
   having a pH comprised between 5 and 12.

2. The admixture according to claim 1, further comprising an additional set accelerating agent.

3. The admixture according to claim 2, wherein the set-accelerating agent is selected from the group consisting of sodium chloride, calcium chloride, sodium thiocyanate, calcium thiocyanate, sodium nitrate, calcium nitrate and mixtures thereof.

4. The admixture according to claim 1, wherein the alkanolamine is selected from the group consisting of triethanolamine (TEA), triisopropanolamine (TIPA), diethanolamine (DEA), diethanolisopropanolamine (DEIPA), tetrahydroxylethylethylenediamine (THEED) and mixtures thereof.

5. The admixture according to claim 1, having a pH comprised between 5.5 and 7.

6. A method for preparing a set-accelerating admixture for hydraulic compositions comprising the steps:
   (1) adding a concentrated strong acid to an aqueous solution of alkanolamine;
   (2) adding to the product obtained in step (1) an aqueous solution of an alkali metal or alkaline earth metal chloride and/or sulfate; and
   (3) adjusting the pH to a value from 5 to 12, before or after step (2).

7. The preparation method according to claim 6, wherein step (1) is carried out by adding concentrated sulfuric acid and step (2) is carried out by adding a solution of an alkali metal chloride.

8. The preparation method according to claim 6, wherein step (1) is carried out by adding concentrated hydrochloric acid and step (2) is carried out by adding a solution of an alkali metal sulfate.

9. The method according to claim 6, wherein the molar ratio between the amine and the acid in step (1) is comprised between 0.2 to 0.6.

10. The preparation method according to claim 6, wherein step (3) is carried out by adding a base selected from the group consisting of sodium hydroxide and potassium hydroxide.

11. A set-accelerating admixture for hydraulic compositions which may be obtainable by the method according to claim 6.

12. A method for preparing a hydraulic composition, comprising the step for adding an admixture according to claim 1 to the hydraulic binder, before, during or after the grinding.

13. The preparation method according to claim 12, wherein the admixture is added with a dosage from 500 to 10,000 ppm by weight based on the weight of the hydraulic binder.

14. The preparation method according to claim 12 wherein the hydraulic binder is a cement containing less than 75% by weight of clinker.

15. A hydraulic composition, containing a cement with a clinker content of less than 75% by weight and an admixture according to claim 1.

* * * * *